Figure 1:
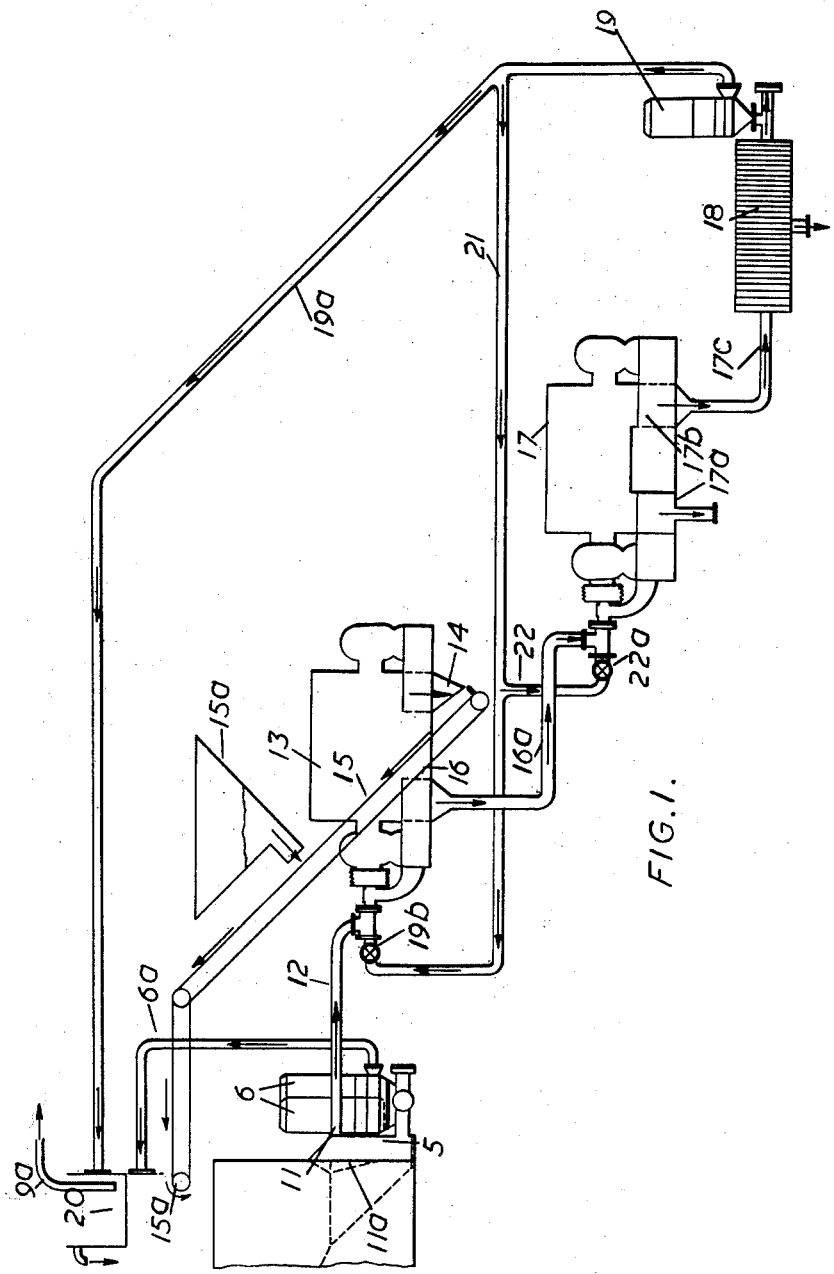

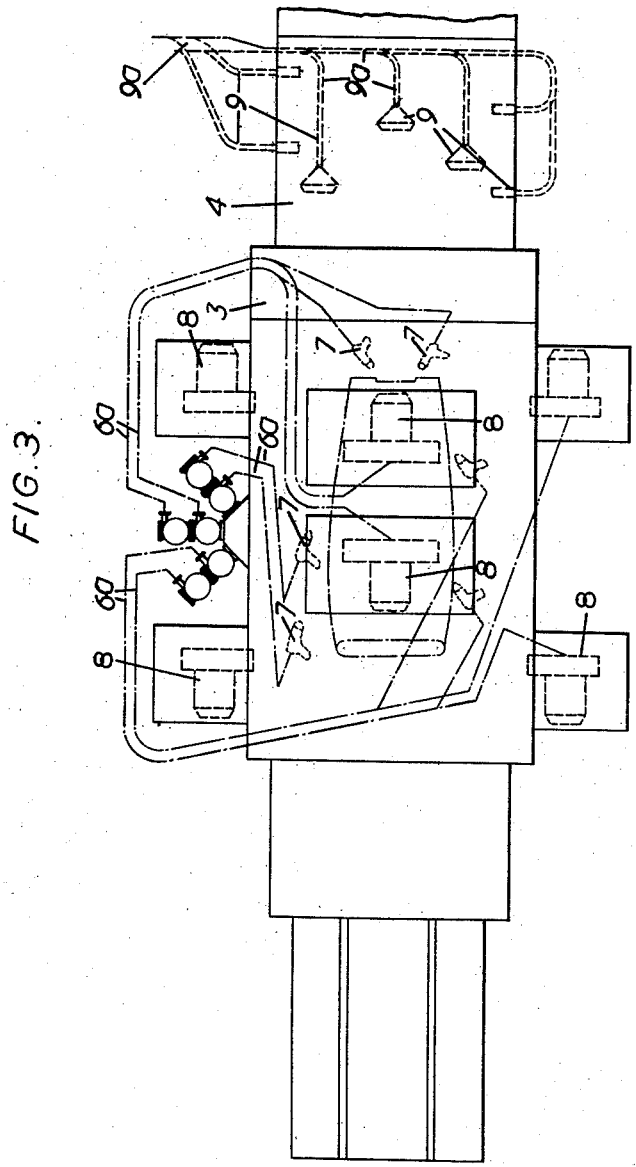

3,103,084
APPARATUS FOR PREPARING SURFACES FOR RECEIVING COATS OF PAINT
Norman Ives Ashworth, 49 High St., Henley-in-Arden, Solihull, England
Filed May 25, 1960, Ser. No. 31,724
Claims priority, application Great Britain May 27, 1959
3 Claims. (Cl. 51—8)

This invention relates to an apparatus for "flattening down" the surface of a car body or work-piece after the application of filler or primer coat of paint or the like preparatory to receiving the finishing coat or coats of paint or the like by brushing, spraying, electrostatic spraying, dipping or roll action.

Prior to this invention, flattening down was carried out by a rubbing action on the filler or primer coat surface with the aid of wet and dry abrasive cloth, pumic powder or the like, the rubbing being effected by hand or semi-automatic means, but the resultant finish gives a scratched effect and in the majority of cases this scratching effect is directional. The result is that the finishing coats tend to reproduce any defects on the surface of the filler or primer coats. Many attempts have been made to improve the process for treating the surface of the filler or primer coat which avoids the laborious process of rubbing down and to obtain a true uniform surface, but such attempts have previously failed and the present invention consists in an apparatus which produces unexpected results and properties on a filler or primer coat.

According to the present invention, abrasive particles are projected onto the surface to be treated to give the required even fine matt surface of uniform capillary action. This is achieved by projecting a mixture of abrasive particles and water onto the surface of the filler or primer coat or other preparatory preparation prior to receiving finishing coat or coats. The abrasive particles are cuboidal or shaped so that the abrasive action is substantially the same at any place of contact of the particle on the filler or primer coat surface. The specific gravity of the abrasive is 2 to 5 and preferably 3.9, the mesh size being 280 to 500. The abrasive may be aluminous oxide or any other known abrasive. The mixture is accelerated by a centrifugal impeller having radial vanes, or alternatively by the introduction of compressed air into the stream of mixture at a gun nozzle, the compressed air pressure being between 60 and 120 p.s.i. The centrifugal impeller has blades, the tips of which travel over a circle of 16 inches diameter to rotate at between 2,000 and 3,500 r.p.m., or any alternative size of impeller that gives similar peripheral speeds.

The even fine matt surface has the effect of producing an even creep in all directions over such surface of the paint applied thereto. This creep is produced by capillary action and the matt surface produced in the apparatus according to this invention augments this action.

The water in the mixture of abrasive particles and water gives a more delicate grinding action of the face of the primer or filler coat and the reaction of the water causes the abrasive particles to also move in a somewhat lateral direction over the surface and give a delicate even matt surface without breaking down the body of the primer or filler coat.

The car body or other work-piece can be moved in relation to the blast of abrasive particles or the blast moved in relation to the work-piece at a constant speed to obtain an even finish.

Further according to this invention, the apparatus is such that it can be in continuous operation over long periods and at the same time effect a standard treatment of the surface thus obviating gradual variation. The mixture of abrasive particles and water after being projected on the surface to be treated returns to a sump and is pumped back to the spray guns or throwing wheels, but repeated application of the abrasive particles breaks such particles to smaller size and would thus vary the treatment of the surface with the consequent variation of the finishing coat applied to the surface by a standard process in a continuous process, and by this invention a standard size of abrasive is kept in constant circulation. Further according to the invention, water used in this apparatus and the subsequent washing of the treated surface is cleaned and kept in constant use, thus effecting great economy in the quantity of water used in the process of treating the surface with a mixture of abrasive particles and water and a subsequent washing process.

Figure 2:
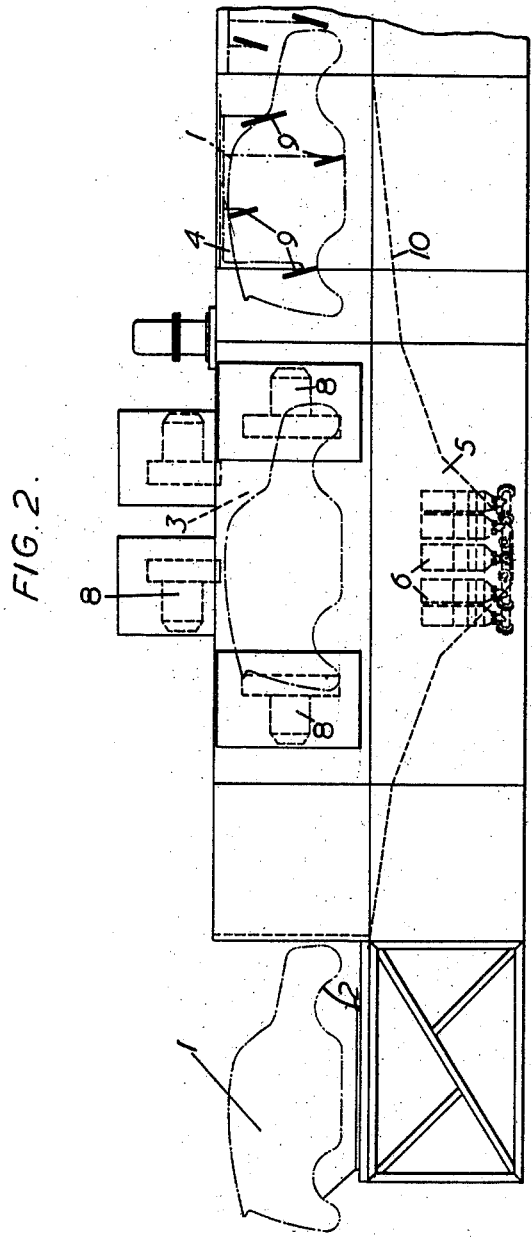

Referring to the drawings:
FIGURE 1 is a diagrammatic view showing a general arrangement for treating a motor car body.
FIGURE 2 is a plan view of FIGURE 1, and
FIGURE 3 is a diagrammatic view showing the circulation of the water and abrasive for treating a car body.

Motor car bodies 1 to be treated are mounted on a conveyor 2 which moves a car body into an air lock compartment which prevents excessive escape of blasting mixture to atmosphere and then into a compartment 3 in which it is treated with the abrasive mixture whilst the conveyor is moving, and the car body then proceeds through a compartment 4 for washing the treated surface by water sprays and this water is drained to the water-abrasive sump 5 feeding the pumps 6 supplying the water-abrasive mixture to the means for projecting the mixture to the surface to be treated.

In one construction, the sump 5 is provided for the mixture of abrasive particles and water and pumps 6 extract the mixture at a low level in the sump for feeding through conduits 6a, spray guns 7 and/or impellers 8 for projecting the mixture on to the surface of the car body 1, and the mixture passing from the car body is drained back to the sump 5. The car bodies 1 are mounted on the conveyor 2 and after treatment with the abrasive mixture are moved to a position 4 for washing with water. The water is sprayed on the body by a mixture of air under pressure and water by spray guns 9 to produce an atomised spray to give an effective quick washing action with a minimum of water. This washing water is drained from the washing compartment 4 to the inclined side 10 of said sump 5. The abrasive and water mixture in this sump is, by branch circulation from the pumps or by paddles, maintained in a state of controlled agitation, such that broken down abrasive particles and pigment particles float to the supper portion of the liquid in the sump 5 and are discharged through an overflow outlet 11 in the side of the sump 5 which is guarded, so that undue turbulence is prevented at the overflow to allow heavier abrasive particles of the required weight for use to sink in the sump. The perforated screen 11a guards the entrance of the top depth of water in the sump against direct unrestricted flow to the outlet 11. The overflow mixture is passed by a pipe 12 to a centrifugal classifier 13 which separates the heavier abrasive particles which can be re-used an which are fed through the outlet 14 at one end of the classifier to a conveyor 15 or the like which returns at 15a the particles to said sump 5. The broken down abrasive particles and pigment are fed through the outlet 16 of the classifier 13 and pipe 16a to a second centrifugal classifier 17 which separates the broken down abrasive particles and delivers same to waste through the outlet 17a, and the water and pigment particles are passed from the outlet 17b of the classifier 17 and by pipe 17c through a filter 18 for removing the pigment to a pump 19, so that clean water passes through the pump and is fed by pipe 19a to a storage tank 20 from which water is pumped through conduits 9a to the washing sprayers 9, overflow from the tank 20 passes to the sump 5. If the mater contains harmful salts an ion exchange unit can be fitted adjacent to the water storage tank and all water pumped to the wash nozzles will be circulated through this unit. A branch pipe 21 from the discharge pipe 19a from the last mentioned pump 19 delivers water through a control valve 19b to assist the discharge overflow from the sump 5 through the first mentioned centrifugal classifier 13 and also through another branch pipe 22 and a control valve 22a to the second mentioned classifier 17, so that the water passes back through the classifiers and pigment filter 18 back to the pump 19.

A supply of fresh abrasive particles is supplied from the tank 15a to aforementioned conveyor 15 to replenish the abrasive discharged to waste by the said second centrifugal classifier 17 and additional fresh water is supplied to said supply tank 20 feeding the wash sprayers to replenish wastage.

Due to the nature of the process, the apparatus is liable to wear and a few of the component parts have a limited life, such as pump, guns, throwing wheel impellers etc. The machine is so designed to enable stand by units to be brought into action as soon as any item fails without any loss in the production cycle.

The centrifugal classifiers 13 and 17 may be rotating cylinders having outer outlets in one end for discharging heavier material and inner outlets at the other end for the lighter material and the water circulated by the pump 19 is utilised by by-pass branch pipes 21 and 22 for augmenting the flow of material through the centrifugal classifiers.

By this invention the contents of the main blasting sump 5 as aforedescribed are agitated so that the heavier abrasive particles remain at the bottom mixed with the required proportion of water for feeding the pumps 6, whilst lighter broken down abrasive particles and pigment particles float to discharge through an overflow. The large volume of water flowing through the sump will ensure the efficient removal of waste and will carry away also a proportion of abrasive particles of usable size and this is re-claimed with the waste water. The overflow passes through a particle classifying system which extracts the particles, and clean water passes to a pump which feeds the water to the supply tank 20 for the washing sprayers, so that a continuous circulation of the water is obtained, and means are provided for maintaining a replenishment of abrasive particles of the required size to replace extractions of waste abrasive particles and any loss of water, and thus maintain the process at a predetermined standard for long periods. Futhermore the consumption of water and abrasive is reduced to a minimum which is an important feature, in addition to maintaining a uniform treatment of surface of the car body or like surface.

After washing treatment the car body passes into a drying section, this may be heated by infra red, electrical elements, gas or any known means, but at one stage during this operation high velocity warm air must be discharged over the car body to remove any residual micro-particles prior to spraying, or alternatively a high powered suction device can be used to remove the residual dry abrasive from the car body.

The means for automatically maintaining the sump 5 supplying the abrasive mixture to the pumps 6 with the correct mixture of abrasive particles and water may be separate from the process of feeding the washing sprays 9, and the water used for washing could be separately re-claimed. The sump 5 would have as aforedescribed the waste abrasive drawn away by overflow from the sump, whilst maintaining the mixture correct at the lower portion of the sump for feeding the pump and overflow being protected against undue turbulence at the overflow, which turbulence may be caused in the sump for maintaining correct mixture for feeding the pump and allowing waste abrasive to be discharged with the overflow; but allowing automatic feeding of correct abrasive particles to replenish abrasive discharged from the overflow and also re-claiming the water for re-use in the circulation.

In a modified form, the water from the sprayers 9 may drain to a separate wash sump and a water overflow from this separate sump may pass into the main abrasive water blasting sump 5, and this overflow can be controlled to permit a graduated flow of top-up water to the abrasive and water blasting sump to provide for the overflow to the classifiers. The abrasive and paint pigment retained in the said separate wash sump is pumped into a classifying system, the good abrasive from which is automatically fed into the abrasive water blasting sump 5 and the clean water back to the supply for the wash nozzles 9.

Having thus described the invention, what is claimed as new and desired to be secured by Letters Patent is:

1. Apparatus for carrying out the process of flattening down the surface of a workpiece after the application of a filler or primer coat of paint and prior to receiving a finishing coat of paint, comprising a work chamber in which the workpiece is supported, means for projecting a mixture of abrasive particles and water on to the workpiece, a pipe circuit for said mixture including separating means for removing relatively small particles from the mixture, a sump below the work chamber, pumping means for feeding the mixture from the sump to the abrasive projecting means, said sump having an overflow outlet, means for agitating the mixture in the sump to cause broken-down abrasive particles and pigment particles to float in the upper portion of the sump, said separating means in said pipe circuit comprising a first centrifugal classifier connected to the overflow outlet from the sump wherein abrasive particles above a certain size are separated out, conveyor means for returning said separated particles to the sump for further use, a second centrifugal classifier and filter receiving the relatively small particles from said first classifier and a storage tank connected in the circuit to receive clarified water from said filter and supply surplus water to the sump for maintaining the overflow therefrom.

2. Apparatus according to claim 1 including means for subjecting the workpiece to a washing process with water after the treatment and pipe means connecting the overflow from said washing process to the said sump below the work chamber.

3. Apparatus according to claim 1 including a connection from the pump for circulating water through said first centrifugal classifier.

References Cited in the file of this patent
UNITED STATES PATENTS

| | | |
|---|---|---|
| 2,605,596 | Uhri | Aug. 5, 1952 |
| 2,612,731 | Gladfelter et al. | Oct. 7, 1952 |
| 2,613,482 | Hamacher | Oct. 14, 1952 |
| 2,667,014 | Gladfelter et al. | Jan. 26, 1954 |
| 2,763,964 | Duce | Sept. 25, 1956 |
| 2,948,092 | Fuller | Aug. 9, 1960 |